US010013027B2

(12) United States Patent
Sun (10) Patent No.: US 10,013,027 B2
(45) Date of Patent: Jul. 3, 2018

(54) FLEXIBLE DISPLAY DEVICE (71) Applicant: BOE Technology Group Co., Ltd., Beijing (CN)

(72) Inventor: Yanliu Sun, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 0 days.

(21) Appl. No.: 15/315,740

(22) PCT Filed: Apr. 12, 2016

(86) PCT No.: PCT/CN2016/079036
  § 371 (c)(1),
  (2) Date: Dec. 2, 2016

(87) PCT Pub. No.: WO2016/192464
  PCT Pub. Date: Dec. 8, 2016

(65) Prior Publication Data
  US 2017/0205853 A1  Jul. 20, 2017

(30) Foreign Application Priority Data
  Jun. 2, 2015 (CN) .......................... 2015 1 0295886

(51) Int. Cl.
  G06F 1/16 (2006.01)
  H05K 5/00 (2006.01)
  H05K 7/00 (2006.01)

(52) U.S. Cl.
  CPC ................................ *G06F 1/1652* (2013.01)

(58) Field of Classification Search
  CPC ......... G06F 1/1652; G06F 1/1613; G06F 1/16
  (Continued)

(56) References Cited

U.S. PATENT DOCUMENTS 6,577,496 B1* 6/2003 Gioscia ................. G06F 1/1616
  345/156
8,605,421 B2* 12/2013 Verschoor ............. G06F 1/1652
  361/679.21

(Continued)

FOREIGN PATENT DOCUMENTS

CN   1744803 A   3/2006
CN   1909565 A   2/2007

(Continued)

OTHER PUBLICATIONS

Jul. 8, 2016—(WO) International Search Report and Written Opinion Appn PCT/CN2016/079036 with English Tran.

(Continued)

Primary Examiner — Anthony Haughton
(74) Attorney, Agent, or Firm — Banner & Witcoff, Ltd.

(57) ABSTRACT

A flexible display device is disclosed. The flexible display device includes a flexible display screen and at least two supporting plates configured to fix the flexible display screen, wherein one supporting plate of the at least two supporting plates is rotatable relative to the other supporting plate until they are overlap each other, and the flexible display device further comprises: a guide component disposed between the two supporting plates and configured to prevent a bending portion of the flexible display from being squeezed by the two adjacent supporting plates. When the flexible display is folded, the bending portion thereof can be held in a space supported by the guide component and the two supporting plates, thereby preventing the problem of wrinkles of the flexible display screen and extending the life time.

15 Claims, 4 Drawing Sheets (58) Field of Classification Search
USPC ............... 361/679.21–679.3, 679.55, 679.56
See application file for complete search history.

(56) References Cited

U.S. PATENT DOCUMENTS

| | | | |
|---|---|---|---|
| 8,971,031 B2 * | 3/2015 | Mok ..................... | G06F 1/1652 |
| | | | 349/58 |
| 9,348,450 B1 * | 5/2016 | Kim ....................... | G06F 1/1681 |
| 9,557,771 B2 * | 1/2017 | Park ....................... | G06F 1/1641 |
| 9,710,033 B2 * | 7/2017 | Yamazaki ............. | G06F 1/1635 |
| 9,733,744 B2 * | 8/2017 | Lee ........................ | G06F 3/0412 |
| 9,760,126 B2 * | 9/2017 | Shin ....................... | G06F 1/1652 |
| 2012/0314400 A1 | 12/2012 | Bohn et al. | |
| 2014/0355195 A1 | 12/2014 | Kee et al. | |

FOREIGN PATENT DOCUMENTS

| | | |
|---|---|---|
| CN | 101573879 A | 11/2009 |
| CN | 103136490 A | 6/2013 |
| CN | 103578356 A | 2/2014 |
| CN | 103620516 A | 3/2014 |
| CN | 104464529 A | 3/2015 |
| CN | 104916230 A | 9/2015 |
| JP | 2008216844 A | 9/2008 |

OTHER PUBLICATIONS

Dec. 23, 2016—(CN) First Office Action Appn 201510295886.1 with English Tran.

* cited by examiner

FIG. 8

FLEXIBLE DISPLAY DEVICE

The application is a U.S. National Phase Entry of International Application No. PCT/CN2016/079036 filed on Apr. 12, 2016, designating the United States of America and claiming priority to Chinese Patent Application No. 201510295886.1, filed on Jun. 2, 2015. The present application claims priority to and the benefit of the above-identified applications and the above-identified applications are incorporated by reference herein in their entirety.

FIELD OF THE ART

Embodiments of the invention relate to the technical field of display technologies, more particularly, to a flexible display device.

BACKGROUND

Currently, electronic products with a display such as mobile phones, tablet PCs and the like are used to meet not only people's working needs, but also people's entertainment needs. In order to allow people to enjoy an immersive display, large screen has become the development trend. However, electronic products with a relatively large display screen need a relatively large storage space, which makes it inconvenient to carry such products. In order to solve the above problem, flexible display-type electronic products (hereafter referred to as flexible display device) come into being.

A conventional flexible display device comprises a display and two supporting plates, wherein the two supporting plates are connected to each other through a hinge and are fixedly connected to the flexible display both. When it needs to carry such a flexible display device, it can realize the fold of the flexible display device through folding the two supporting plates, making it very convenient to carry the device. However, when the flexible display device is in folded state, the bending portion of the flexible display can be easily squeezed, which may result in wrinkles. When the wrinkles are conspicuous, the display quality is seriously affected, and the flexible display screen needs to be replaced, causing a short life time of the flexible display screen in the flexible display device.

SUMMARY

An aspect of the invention provides a flexible display device, which comprises a flexible display screen and at least two supporting plates configured to fix the flexible display screen, wherein one of the at least two supporting plates is rotatable relative to the other supporting plate until the at least two supporting plates overlap each other, and the flexible display device further comprises a guide component, wherein the guide component is disposed between two adjacent supporting plates of the at least two supporting plates and configured to prevent a bending portion of the flexible display screen from being squeezed by the two adjacent supporting plates.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present disclosure, are not intended to indicate any sequence, amount or importance, but distinguish various components. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

An embodiment of the invention provides a flexible display device comprising a flexible display screen and at least two supporting plates configured to fix the flexible display screen, wherein one of the at least two supporting plates can rotate relative to the other supporting plate until they overlap each other. The flexible display device further comprises: a guide component disposed between the two adjacent supporting plates and configured to prevent a bending portion of the flexible display from being squeezed by the two adjacent supporting plates.

Figure 1:
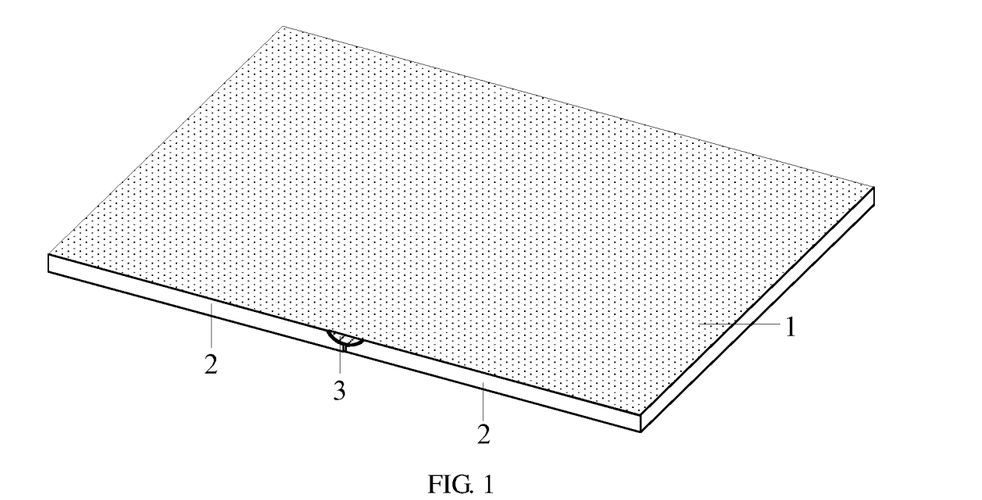
FIG. 1 schematically illustrates a flexible display device in unfolded state in accordance with an embodiment of the invention.
Figure 2:
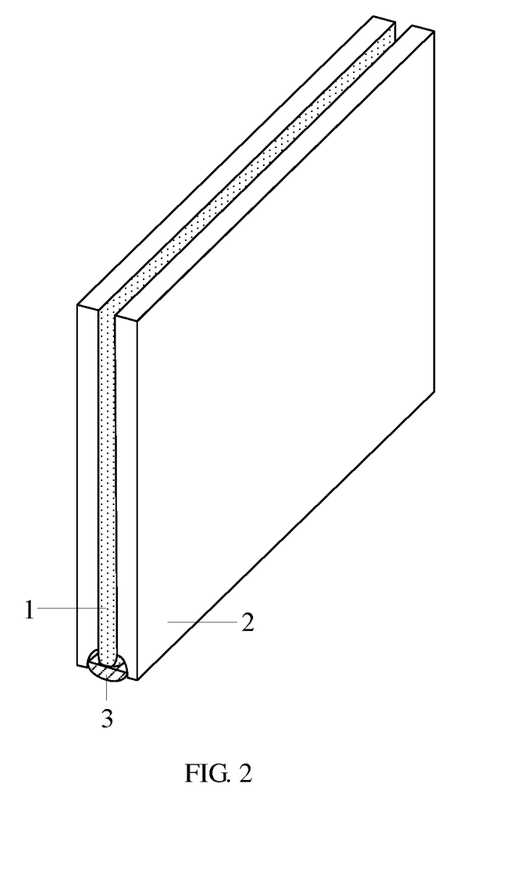
FIG. 2 schematically illustrates a flexible display device in folded state in accordance with an embodiment of the invention.
Figure 5:
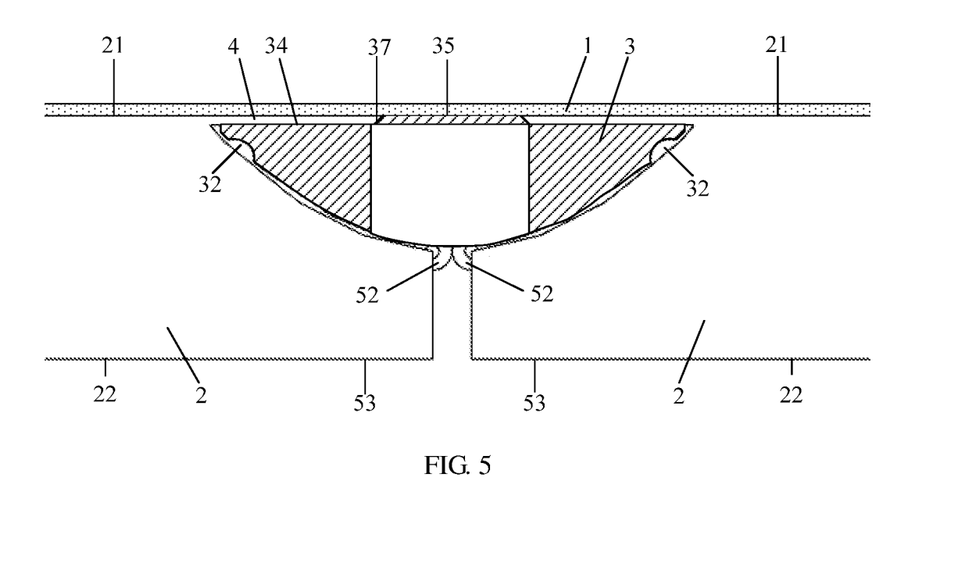
FIG. 5 schematically illustrates a partial enlarged view of a flexible display device in unfolded state in accordance with an embodiment of the invention.
Figure 7:
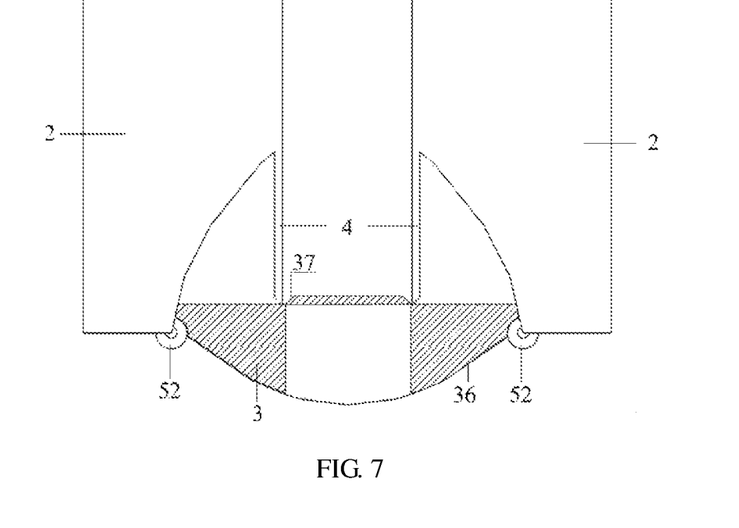
FIG. 7 schematically illustrates a partial enlarged view of a flexible display device in folded state in accordance with an embodiment of the invention.

As an example illustrated in FIG. 1, the flexible display device comprises a flexible display screen 1 and a plurality of supporting plates 2, wherein the plurality of supporting plates 2 are fixed to the flexible display screen 1 and are arranged in a row in a spaced apart manner on the backside of the flexible display screen 1, guide components 3 configured to prevent a bending portion of the flexible display screen 1 from being squeezed by the supporting plates 2 are disposed between two adjacent supporting plates 2, and adjacent supporting plates 2 can rotate relative to the other to a folded state. The connection between the supporting plates 2 and the flexible display screen 1 can be realized through for example bonding. When the flexible display device is in unfolded state, the two supporting plates 2 are on a same plane (as illustrated in FIGS. 2 and 5). When the flexible display device is in folded state, the two supporting plates 2 overlap each other and the flexible display is between the two supporting plates 2 (as illustrated in FIG. 7).

Still referring to FIG. 1, taking the number of the supporting plates 2 in the flexible display device being two as an example, the two supporting plates 2 can rotate inwards to folded state, thus the flexible display device can be folded. The flexible display device in folded state is as illustrated in FIG. 2. In this case, in comparison with the flexible display device in unfolded state and taking up a relatively large storage space, the flexible display device in folded state can significantly reduce the storage space and is convenient to be carried and stored. In the embodiment as illustrated in FIG. 1 and FIG. 2, the guide component 3 is disposed between the two adjacent supporting plates 2. When the two supporting plates 2 are in folded state, the guide component 3 separate the opposite ends of the two supporting plates 2 as specifically illustrated in FIG. 2, thus holding up an accommodating space for the bending portion of the flexible display screen 1 and allowing the bending portion of the flexible display screen 1 to be in the accommodating space, thereby preventing the occurrence of wrinkles in the bending portion of the flexible display screen 1. Due to the above fact, the flexible display device provided by the embodiment of the invention does not require to replace the flexible display screen 1 frequently, thereby extending the life time of the flexible display screen 1.

Moreover, as can be seen in FIG. 2, when the flexible display device is in folded state, the flexible display screen 1 is between the two supporting plates 2 and the guide component 3, thereby protecting the flexible display screen 1 from damages such as abrasion, piercing and the like through the two supporting plates 2 and the guide component 3. In order to improve the protection effect on the flexible display screen 1, the supporting plates 2 have a relatively high strength. The supporting plates 2 may be made of a metal or a plastic material in an example. In order to make the flexible display device to be relatively lightweight, the supporting plates 2 may be made of such as a high-strength plastic material.

In the embodiment as illustrated in FIG. 1, the flexible display device comprises two supporting plates 2 and can be folded for once, thus the flexible display device is convenient to be carried and stored when in folded state. On the premise that the size of the flexible display screen 1 remains unchanged, it may dispose more than two supporting plates 2, such as three or four, in the flexible display device to allow the flexible display device to be folded for two or three times, thereby allowing the folded flexible display device to be smaller and more convenient to be carried and stored.

The guide component 3 may be mounted in the flexible display device in a various ways. The mounting methods are listed as followed.

Figure 3:
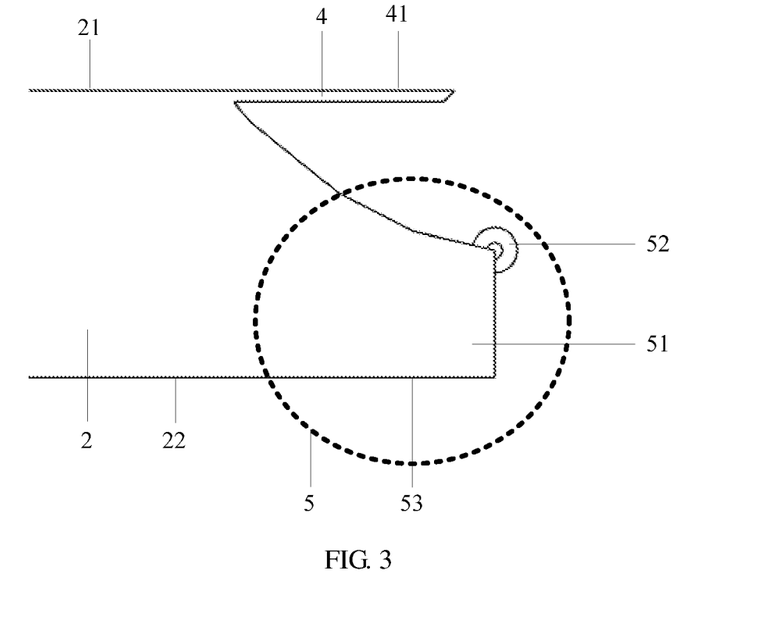
FIG. 3 schematically illustrates configurations of a first clamping portion and a second clamping portion in accordance with an embodiment of the invention.

Method I: As illustrated in FIG. 3, a first clamping portion 4 and a second clamping portion 5 are disposed at the end of each of the two adjacent supporting plates 2, the ends of the two adjacent supporting plates 2 are close to each other, and the first clamping portion 4 and the second clamping portion 5 on a same supporting plate 2 cooperate with each other such that a part of the guide component 3 is restricted between them. In other words, the first supporting plate 2 and the second supporting plate 2 are the two adjacent supporting plates 2, the first clamping portion 4 and the second clamping portion 5 disposed on the end of the first supporting plate 2 close to the second supporting plate 2 form the "left hand", the first clamping portion 4 and the second clamping portion 5 disposed on the end of the second supporting plate 2 close to the first supporting plate 2 form the "right hand", and the "left hand" and the "right hand" hold a part of the guide component 3 respectively such that the guide component 3 is restricted between the adjacent supporting plates 2.

Method II: For the guide component 3 disposed between the first supporting plate 2 and the second supporting plate 2, an end of the guide component 3 close to the first supporting plate 2 is connected to the first supporting plate 2 through a hinge, and an end of the guide component 3 close to the second supporting plate 2 is connected to the second supporting plate 2 through a hinge, thereby mounting the guide component 3 in the flexible display device, wherein the first supporting plate 2 and the second supporting plate 2 are the two adjacent supporting plates 2.

When the guide component 3 is mounted using method I, there are a variety of structures of the first clamping portion 4 and the second clamping portion 5. In the embodiment of the invention, as illustrated in FIG. 3, the first clamping portion 4 is in a flat-plate shape and is disposed on a side of the supporting plate close to the flexible display screen. The second clamping portion 5 comprises a plate-shaped body 51 and a roller 52 disposed on the plate-shaped body 51. The roller 52 extends towards the first clamping portion 4, and the roller 52 is in contact with a bottom surface 36 of the guide component 3. That is, a cavity is formed between the plate-shaped body 51 and the first clamping portion 4, and the roller 52 can move in the cavity along the surface of the plate-shaped body 51 to the first clamping portion 4. The first clamping portion 4 may be an integral flat plate, or may be a plurality of strip-shaped plates arranged side by side. Similarly, the plate-shaped body 51 of the second clamping portion 5 may be an integral plate, or may be a plurality of strip-shaped plates arranged side by side, and it is not limited in the embodiment. It can be understood that, when those skilled in the art design the specific structures of the first clamping portion 4 and the second clamping portion 5, factors such as the shape and size of the guide component 3 need to be under consideration such that the fabricated first clamping portion 4 and second clamping portion 5 can restrict the guide component 3 in the flexible display device. In the flexible display device of the embodiment of the invention, the roller 52 keeps in contact with the bottom surface 36 of the guide component 3 such that the roller 52 can move along the bottom surface 36 of the guide 3 during the folding/unfolding process of the flexible display device. That is, the roller 52 can move between the bottom surface 36 of the guide 3 and the surface of the plate-shaped body 51, such that the folding/unfolding process of the flexible display device is relatively smooth, thereby facilitating the protection of the flexible display screen 1, moreover, allowing the folding/unfolding process of the flexible display device to be relatively smooth and facilitating the manual folding/unfolding operation of the flexible display device.

In the embodiment of the invention, the roller 52 moves along the bottom surface 36 of the guide component 3. In order to reduce the frictional resistance of the roller 52 moving along the bottom surface 36 of the guide component 3, in the embodiment of the invention, the bottom surface 36 of the guide component 3 is a convex surface, the surface of the plate-shaped body 51 is a concave surface, and the two surfaces match with each other in shape. Furthermore, as an example, the bottom surface 36 of the guide component 3 is a polished surface and the surface of the roller 52 is a polished surface. In order to reduce the fabrication cost, only the portions where the bottom surface 36 of the guide component 3 contacts the roller 52 are polished in exemplary implementation. In the embodiment of the invention, the roller 52 may be a long roller, or may be a plurality of short rollers arranged in series. When the roller 52 is a plurality of short rollers arranged in series, in comparison with the configuration that the roller 52 is one long roller, the contact area between the roller 52 and the bottom surface 36 of the guide component can be reduced, thereby reducing the frictional resistance of the roller 52 moving along the bottom surface 36 of the guide component 3. As an example, the roller 52 is made up of two short rollers arranged in series, and the two rollers are disposed on the opposite ends of a shaft 62 respectively. As another example, it can also reduce the friction through such as applying lubricating oil on the bottom surface 36 of the guide component 3 or forming a slide rail for accommodating the roller 52 on the bottom surface 36 of the guide component 3, and it will not be elaborated herein.

Figure 4:
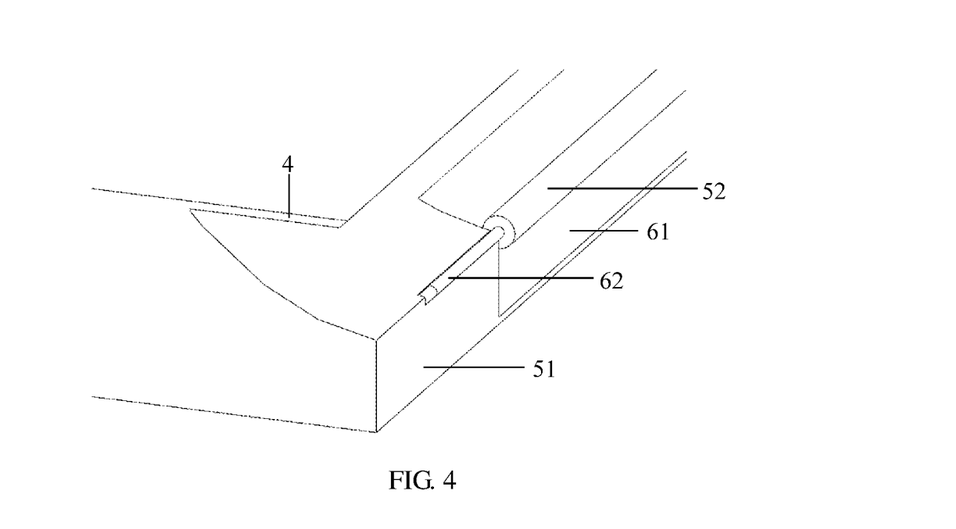
FIG. 4 schematically illustrates a connection structure between a roller and a plate-shaped body in accordance with an embodiment of the invention.

In the embodiment of the invention, there are a variety of connection structures between the roller 52 and the plate-shaped body 51. In the embodiment of the invention, as illustrated in FIG. 4, the roller 52 is connected to the plate-shaped body 51 through the shaft 62, wherein the shaft 62 is fixed on the plate-shaped body 51 through an elastic support (not shown in the Figures). In this case, during the folding/unfolding process of the flexible display device, the elastic support can cushion the force applied to the shaft 62 such that the shaft 62 does not easily break. Moreover, a groove 61 is formed at an end portion of the plate-shaped body 51 to provide rolling space for the roller 52. In an exemplary implementation, in order to guarantee the strength and surface smoothness of the roller 52, the roller 52 is made of such as rigid plastics. In order to guarantee that the shaft 62 has a relatively high strength, the shaft 62 is made of such as a high strength metal. The elastic support may be high strength springs or of other elastic supporting structures, which can act as a support for the shaft 62 and also have certain elasticity.

For the convenience of viewing, as illustrated in FIG. 5, when the flexible display device is in unfolded state, the adjacent supporting plates 2 are located in a same horizontal plane and the rollers 52 of the adjacent supporting plates 2 contact each other. The two rollers 52 are against each other such that the adjacent supporting plates 2 keep on a same plane, thereby allowing the flexible display screen 1 to be in the flat state. When the flexible display screen 1 is in the flat state for display, it has a relatively large display area viewed by the user. Moreover, when the flexible display screen 1 is in the flat state, it is convenient for touch operation, thereby facilitating human-computer interaction.

Figure 6:
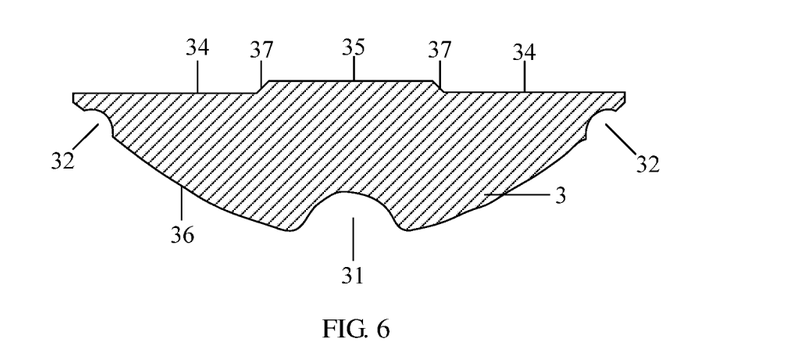
FIG. 6 schematically illustrates a cross section of the guide component in accordance with an embodiment of the invention.

In order to keep the flexible display device in folded/unfolded state to facilitate viewing/carrying, as illustrated in FIG. 6, a first slot 31 and two second slots 32 are formed on the bottom surface 36 of the guide component 3. The first slot 31 is disposed in a central region of the bottom surface 36 of the guide component 3, and the two second slots 32 are disposed on both sides of the first slot symmetrically. In an exemplary implementation, the shapes and sizes of the first slot 31 and the second slot 32 need to match the rollers 52. As illustrated in FIG. 5, when the adjacent supporting plates 2 are located in a same horizontal plane, both the two rollers 52 are disposed in the first slot 31. As illustrated in FIG. 7, when the adjacent supporting plates 2 are in folded state, the two rollers 52 are each in a second slot 32. In this case, during the unfolding/folding process of the flexible display device, the first slot 31/the second slots 32 function to lock the rollers 52 such that the flexible display device keeps unfolding/folded state, thereby facilitating the viewing/carrying.

Figure 8:
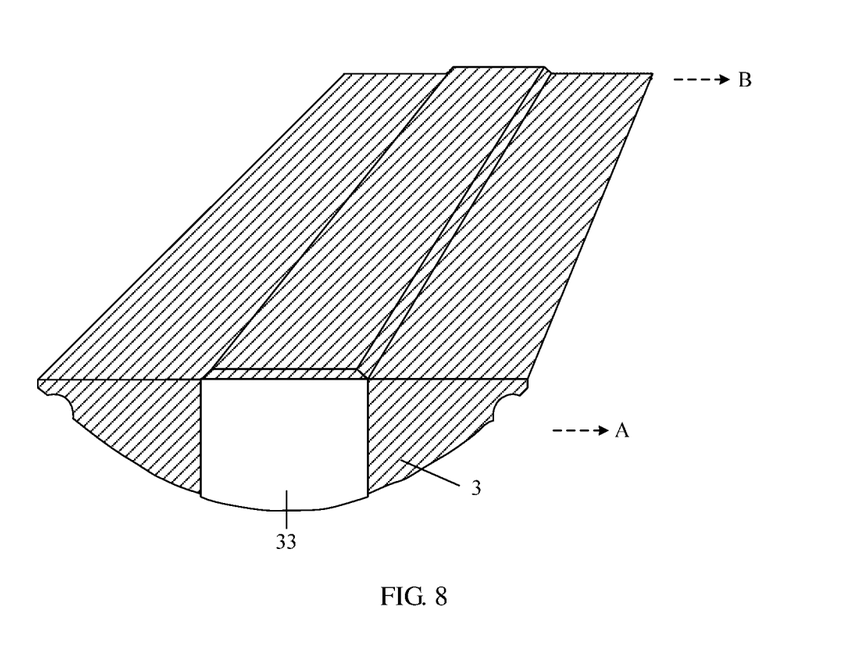
FIG. 8 schematically illustrates a guide component having barriers disposed on both ends in accordance with an embodiment of the invention.

As an example, as illustrated in FIG. 8, a barrier 33 is disposed on each of opposite ends of the guide component 3, i.e., ends A and B. When the flexible display device drops by accident in folded state, the barrier 33 can prevent the edge of the first slot 31 from touching the ground, thereby protecting the first slot 31. The barrier 33 may be mounted on the end in any manner, such as being fixed by a bolt or being adhered by adhesive agent.

As an example, as illustrated in FIG. 3, a top surface 41 of the first clamping portion 4 is flush with a top surface 21 of the corresponding supporting plate 2, and a bottom surface 53 of the second clamping portion 5 is flush with a bottom surface 22 of the corresponding supporting plate 2. In this case, when the flexible display device is in unfolded state as illustrated in FIG. 5, the first clamping portion 4 and the supporting plates 2 are both in contact with the flexible display screen 1 so as to support the flexible display screen 1, thereby facilitating the protection to the flexible display screen 1 and extending the life time of the flexible display screen 1. Moreover, as illustrated in FIG. 5, the bottom surface 53 of the second clamping portion 5 and the bottom surface 22 of the supporting plate 2 are located in a same horizontal plane. In this case, the flexible display device in unfolded state is more stable when being placed on the table.

As an example, as illustrated in FIG. 6, the top surface 35 of the guide component 3 is flat and a recess 34 is formed thereon. The first clamping portion 4 fits into the recess 34, that is, the recess 34 accommodates the first clamping portion 4, and the fitting structure is as illustrated in FIG. 5. In this case, the flexible display device has a more stable structure when in unfolded state. Moreover, a sidewall 37 of the recess 34 (i.e., the portion where the recess 34 contacts the end of the first clamping portion 4) has a polished surface, thus the end of the first clamping portion 4 can slide along the sidewall 37 of the recess 34 during the folding/unfolding process of the flexible display device, thereby facilitating the continuity of the folding/unfolding process of the flexible display device. Furthermore, it can further be seen from FIG. 5, when the flexible display device is in unfolded state, the top surface 35 of the guide component 3 contacts the flexible display screen 1, thus functioning to support the flexible display screen 1, thereby facilitating the protection to the flexible display screen 1 and extending the life time of the flexible display screen 1.

In order to help those skilled in the art to understand the structure of the flexible display device as illustrated in FIG.

5 and FIG. 7 more clearly, the unfolding/folding process of the flexible display device will be described in the following.

As illustrated in FIG. 7, the flexible display device is in folded state. When the folded flexible display device is required to be unfolded, a force pulling outwards is applied on the two supporting plates 2 simultaneously, and the supporting plates 2 transmits the force to the rollers 52 such that the rollers 52 slide downwards along the bottom surface 36 of the guide component 3 (that is, the two rollers 52 move face to face). In the same time, the adjacent supporting plates 2 rotate inwards until the first clamping portion 4 rotate and fit into the recess 34 of the guide component 3, and the left and right rollers 52 enter the two first slots 31 respectively, thereby completing the unfolding operation of the flexible display device. The flexible display device in unfolded state is as illustrated in FIG. 5.

As illustrated in FIG. 5, the flexible display device in unfolded state. When the flexible display device is required to be folded, a force pressing inwards is applied on the two supporting plates 2 simultaneously. In this case, the first clamping portion 4 will apply a pressure downwards on the guide component 3, and the guide component 3 move downwards, thus each of the rollers 52 slides upwards along the bottom surface 36 of the guide component 3 (that is, the two rollers 52 move far away from each other). In the same time, the adjacent supporting plates 2 rotate until the rollers 52 are locked into the second slot 32, thereby completing the folding operation of the flexible display device. The flexible display device in folded state is as illustrated in FIG. 7.

There is only one flexible display screen 1 in the flexible display device in the embodiment of the invention, and it can realize the fold of the display device through folding the adjacent supporting plates 2. In contrast, a conventional flexible display device comprises a plurality of hinged displays, and the fold of the flexible display device is realized through folding the adjacent displays. In comparison with the conventional flexible display device, the flexible display device in the embodiment of the invention overcomes the following technical defects: as there is slit at the joint of the adjacent displays, when a plurality of displays is connected together to display a single image, the display effect at the slit is not satisfactory. Due to the above fact, the flexible display device in the embodiment of the invention has a wider application prospects.

The flexible display device is for example a LCD panel, an E-paper, an OLED panel, a mobile phone, tablet PC, a television, a display, a laptop computer, a digital photoframe, a navigator or any products or components with a display function.

In the flexible display device in the embodiment of the invention, the adjacent supporting plates can rotate to folded state, such that the flexible display device can be folded. When the flexible display device is in folded state, the guide component can prevent the bending portion of the flexible display screen from being squeezed by the supporting plates and allow the bending portion of the flexible display screen to be held in the space supported by the guide component and the supporting plates. In this case, the guide component can prevent the problem of wrinkles of the bending portion of the flexible display screen. Due to the above fact, the flexible display device provided by the embodiment of the invention needs not replace the flexible display frequently, thereby extending the life time of the flexible display screen.

What is described above is related to the illustrative embodiments of the disclosure only and not limitative to the scope of the disclosure; the scopes of the disclosure are defined by the accompanying claims.

The present application claims priority from Chinese Application No. 201510295886.1, filed on Jun. 2, 2015, the disclosure of which is incorporated herein by reference in its entirety.

What is claimed is:

1. A flexible display device, comprising a flexible display screen and at least two supporting plates configured to fix the flexible display screen, wherein one of the at least two supporting plates is rotatable relative to the other supporting plate until the at least two supporting plates overlap each other, and the flexible display device further comprises a guide component, wherein the guide component is disposed between two adjacent supporting plates of the at least two supporting plates and configured to prevent a bending portion of the flexible display screen from being squeezed by the two adjacent supporting plates, wherein the at least two supporting plates are arranged in a spaced apart manner on a backside of the flexible display screen, and the guide component is disposed on the backside of the flexible display screen and between the two adjacent supporting plates, wherein a first clamping portion and a second clamping portion are disposed at an end of each of the two adjacent supporting plates which are close to each other, and a part of the guide component is disposed between the first clamping portion and the second clamping portion, wherein the second clamping portion comprises a plate-shaped body and a roller, a cavity is formed between the plate-shaped body and the first clamping portion, and the roller moves along a surface of the plate-shaped body in the cavity, and wherein the guide component is disposed in the cavity, and the roller is in contact with a bottom surface of the guide component.

2. The flexible display device of claim 1, wherein the first clamping portion is in a flat-plate shape and disposed at a side of the supporting plates close to the flexible display screen.

3. The flexible display device of claim 1, wherein the roller moves between a bottom surface of the guide component and the surface of the plate-shaped body.

4. The flexible display device of claim 1, wherein the bottom surface of the guide component is a convex surface and the surface of the plate-shaped body is a concave surface.

5. The flexible display device of claim 4, wherein the bottom surface of the guide component is a polished surface and a surface of the roller is a polished surface.

6. The flexible display device of claim 1, wherein the two adjacent supporting plates are located in a same plane and two rollers of respective supporting plates are in contact with each other.

7. The flexible display device of claim 6, wherein a first slot is formed in the bottom surface of the guide component, the two adjacent supporting plates are located in a same plane, and the two rollers are disposed in the first slot.

8. The flexible display device of claim 7, wherein two second slots are formed in the bottom surface of the guide component, one of the two adjacent supporting plates is rotatable relative to the other supporting plate until the two adjacent supporting plates overlap each other, and the two rollers are respectively disposed in the two second slots.

9. The flexible display device of claim 8, wherein the first slot is disposed in a central region of the bottom surface of the guide component and the two second slots are respectively disposed at both sides of the first slot, symmetrically.

10. The flexible display device of claim 2, wherein a top surface of the first clamping portion is flush with a top surface of the corresponding supporting plate.

11. The flexible display device of claim 1, wherein a bottom surface of the second clamping portion is flush with a bottom surface of the corresponding supporting plate.

12. The flexible display device of claim 1, wherein a recess is formed in a top surface of the guide component and the recess is configured to accommodate the first clamping portion.

13. The flexible display device of claim 1, wherein the plate-shaped body and the roller are connected to each other through a shaft.

14. The flexible display device of claim 13, wherein a groove is formed at an end portion of the plate-shaped body to provide rolling space for the roller.

15. The flexible display device of claim 1, wherein barriers are disposed on two opposite ends of the guide component.

* * * * *